US012738726B2

(12) United States Patent
Liu et al.

(10) Patent No.: US 12,738,726 B2

(45) Date of Patent: Sep. 15, 2026

(54) POWER SUPPLY DEVICE AND OVERCURRENT ALARM METHOD

(71) Applicant: Delta Electronics (Shanghai) Co., Ltd., Shanghai (CN)

(72) Inventors: Qingchang Liu, Shanghai (CN); Chao Li, Shanghai (CN); Pengfei Wang, Shanghai (CN); Pengcheng Zhu, Shanghai (CN); Bin Li, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 221 days.

(21) Appl. No.: 18/644,059

(22) Filed: Apr. 23, 2024

(65) Prior Publication Data

US 2024/0388078 A1 Nov. 21, 2024

(30) Foreign Application Priority Data

May 16, 2023 (CN) ........................ 202310552159.3
Mar. 28, 2024 (CN) ........................ 202410372695.X

(51) Int. Cl.
*H02H 3/08* (2006.01)
*H02H 3/04* (2006.01)

(52) U.S. Cl.
CPC ................ *H02H 3/08* (2013.01); *H02H 3/04* (2013.01)

(58) Field of Classification Search
CPC .................................. H02H 3/08; H02H 3/04
See application file for complete search history.

(56) References Cited

U.S. PATENT DOCUMENTS

2012/0146655 A1* 6/2012 Suchoff ................ G01R 19/165 324/509
2020/0106257 A1* 4/2020 Gupta .................. G08B 21/182
2021/0096628 A1* 4/2021 Zenati ........................ H02J 7/62
2024/0372547 A1* 11/2024 Masubuchi .......... H03K 17/145

FOREIGN PATENT DOCUMENTS

| | | |
|---|---|---|
| CN | 100420113 C | 9/2008 |
| CN | 202206111 U | 4/2012 |
| CN | 105611665 A | 5/2016 |
| CN | 103034314 B | 6/2016 |
| CN | 106655101 A | 5/2017 |
| CN | 108616108 A | 10/2018 |
| CN | 110445089 A | 11/2019 |
| CN | 111525793 A | 8/2020 |
| CN | 109638967 B | 3/2021 |
| CN | 217824338 U | 11/2022 |

* cited by examiner

*Primary Examiner* — Scott Bauer
(74) *Attorney, Agent, or Firm* — CKC & Partners Co., LLC

(57) ABSTRACT

The application discloses a power supply device and an overcurrent alarm method. The power supply device provides power to a load system and includes: a current sampling module for obtaining a current sampling value; a first comparison module for comparing the current sampling value with an alarm current reference value to obtain a first output value; and a control module for determining whether to send a current alarm signal to the load system based on the first output value, wherein when the current sampling value is greater than or equal to the alarm current reference value, the control module sends the current alarm signal and provides a warning notification to the load system; when the current sampling value is less than the alarm current reference value, the control module does not send the current alarm signal, or the control module sends a current non-alarm signal.

15 Claims, 8 Drawing Sheets

POWER SUPPLY DEVICE AND OVERCURRENT ALARM METHOD

CROSS-REFERENCE TO RELATED APPLICATIONS

This non-provisional application claims priority of China Patent Application No.202310552159.3 filed in P.R. China on May 16, 2023, and China Patent Application No. 202410372695.X filed on Mar. 28, 2024, the entire contents of which are hereby incorporated by reference.

BACKGROUND

1. Field of the Invention

The present disclosure relates to the field of power electronics technology, and particularly to a power supply device and an overcurrent alarm method.

2. Related Art

In common power supply products, overcurrent protection is mainly achieved by a fuse (containing a resettable fuse). Under the protection mode, when overcurrent protection occurs, it will obviously cause disconnection of loads. In intelligent power supply products, a voltage signal generated by the current sensor is generally compared with a rated reference voltage, which represents a current value. When an overload occurs, the power supply is actively cut off to achieve overcurrent protection and prevent damage to the power supply devices.

The traditional overcurrent protection method is effective for protecting the power supply devices, but for the load, power loss may cause significant losses. Particularly, the overcurrent protection method is not appropriate for applications involving power distribution. For example, an power device G with an output power capacity of 1000 W includes three significant loads:

La: a rated power 300 W

Lb: a rated power 300 W

Lc: a rated power 300 W

At this time, the three loads can operate normally. However, if an additional small load Ld of 120 W is added, the power supply device G will enter into overload protection and cut off the power to all loads, which may cause an interruption to essential loads and result in related losses.

Therefore, it is urgent to provide a power supply device and an overcurrent alarm method which can enable the load system to be alerted in advance of an impending overload. This would allow for actively cutting off the non-essential loads or adopting other methods to reduce the load on the power supply device, ensuring the power supply to the essential loads and preventing significant losses due to the power supply device ceasing to provide power to all loads.

SUMMARY

An object of the disclosure is to provide a power supply device and an overcurrent alarm method which can solve one or more problems in the prior art.

In order to achieve the object, the disclosure provides a power supply device electrically connected to a load system for providing power to the load system, the load system including a plurality of loads, the power supply device including: a current sampling module for obtaining a current sampling value; a first comparison module electrically connected to the current sampling module for comparing the current sampling value with an alarm current reference value to obtain a first output value, wherein the alarm current reference value is less than an overcurrent protection reference value; and a control module electrically connected to an output end of the first comparison module for determining whether to send a current alarm signal to the load system based on the first output value, wherein when the current sampling value is greater than or equal to the alarm current reference value, the control module sends the current alarm signal and provides a warning notification to the load system; when the current sampling value is less than the alarm current reference value, the control module does not send the current alarm signal, or the control module sends a current non-alarm signal.

In order to achieve the object, the disclosure further provides an overcurrent alarm method for a power supply device, the power supply device providing power to a load system and including a current sampling module, a first comparison module and a control module electrically connected sequentially, the load system including a plurality of loads, wherein the method includes: obtaining a current sampling value via the current sampling module; comparing the current sampling value and an alarm current reference value to obtain a first output value via the first comparison module, wherein the alarm current reference value is less than an overcurrent protection reference value; and determing whether to send a current alarm signal to the load system based on the first output value via the control module, wherein when the current sampling value is greater than or equal to the alarm current reference value, the control module sends the current alarm signal and provides a warning notification to the load system; when the current sampling value is less than the alarm current reference value, the control module does not send the current alarm signal, or the control module sends a current non-alarm signal.

BRIEF DESCRIPTION OF THE DRAWINGS

To clearly explain the technical solution provided by the disclosure, the accompanying drawings used in the embodiments are hereby briefly introduced.

DETAILED DESCRIPTION

Figure 1:
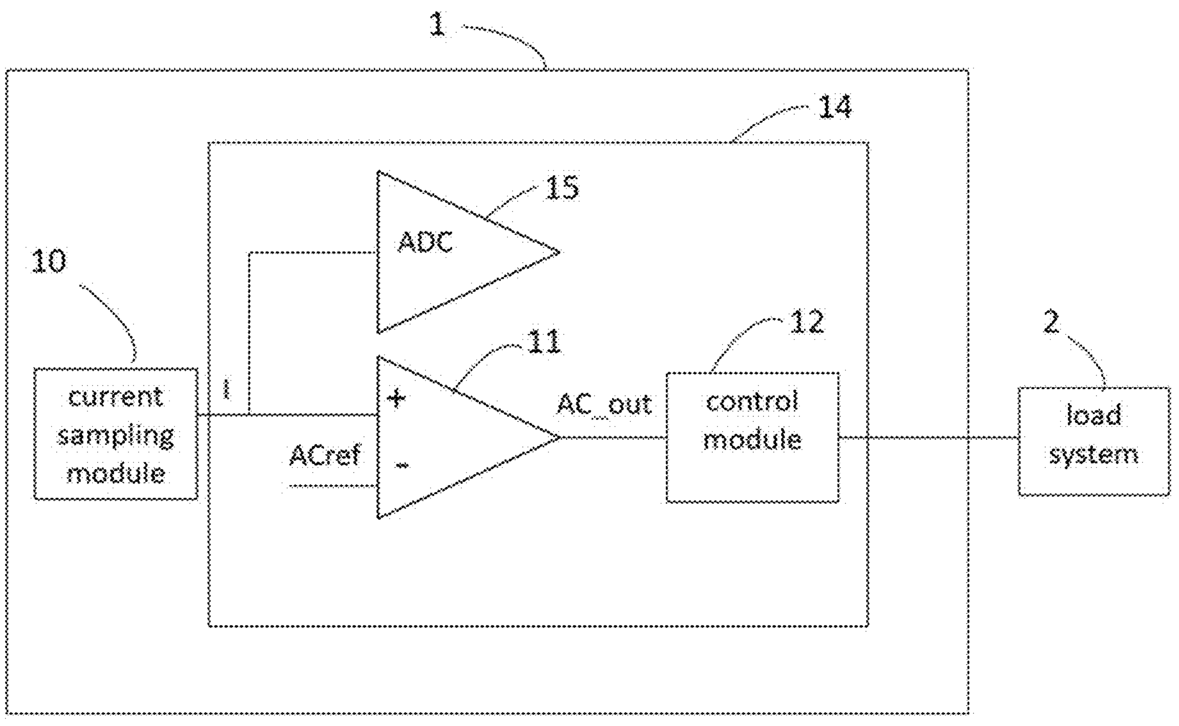
FIG. 1 is a structural diagram of a power supply device in embodiment one of the disclosure.

The exemplary implementations will now be described more fully with reference to the accompanying drawings. However, the exemplary implementations can be implemented in various forms and should not be understood as being limited to the implementations set forth herein; on the contrary, these implementations are provided so that this disclosure will be thorough and complete, and conception of the exemplary implementations will be fully conveyed to those skilled in the art.

When introducing the described and/or illustrated factors or constituent portions or the like, the words "one", "first", "the" and "at least one" represent one or more factors or constituent portions, or the like. The terms "comprise", "include" and "have" represent an open and including meaning, and refer to other factors or constituent portions, or the like, except listed factors or constituent portions, or the like. Moreover, the terms "first", "second" and the like in the claims are only used as signs, instead of limiting the numbers of the object. The same number in the drawings represents the same or similar assembly. On the other hand, the well-known assemblies and steps are not described in the embodiments, so as to avoid causing unnecessary limit to the disclosure. Moreover, for sake of simplifying the drawings, some known customary structures and elements are illustrated in a simple way in the drawings. Finally, "couple" or "connection" used in the disclosure may refer to that two or more elements are in direct physical or electrical contact, or in indirect physical or electrical contact.

FIG. 1 is a structural diagram of a power supply device 1 in embodiment one of the disclosure. As shown in FIG. 1, the power supply device 1 is electrically connected to a load system 2 for providing power to the load system 2, and the load system 2 includes a plurality of loads. The power supply device 1 includes a current sampling module 10 for obtaining a current sampling value I, a first comparison module 11 electrically connected to the current sampling module 10 for comparing the current sampling value I with an alarm current reference value ACref to obtain a first output value AC_out, wherein the alarm current reference value ACref is less than an overcurrent protection reference value OCref, and a control module 12 electrically connected to an output end of the first comparison module 11 for determining whether to send a current alarm signal to the load system 2 based on the first output value AC_out. The first comparison module 11 and the control module 12 are located within a microcontroller unit 14 of the power supply device 1. When the current sampling value I is greater than or equal to the alarm current reference value ACref, the control module 12 sends the current alarm signal and provides a warning notification to the load system 2. Upon receiving the current alarm signal, the load system 2 can be alerted in advance of an impending overload or overcurrent of the loads and determining whether to take some operations to ensure the security of the power supply, for example, disconnecting a portion of the loads. When the current sampling value I is less than the alarm current reference value ACref, the control module 12 does not send the current alarm signal, or the control module 12 sends a current non-alarm signal, such that the power supply device 1 continues to provide power to the load system 2. In this embodiment, the power supply device 1 may adjust the alarm current reference value ACref and the overcurrent protection reference value OCref through programming.

Figure 2:
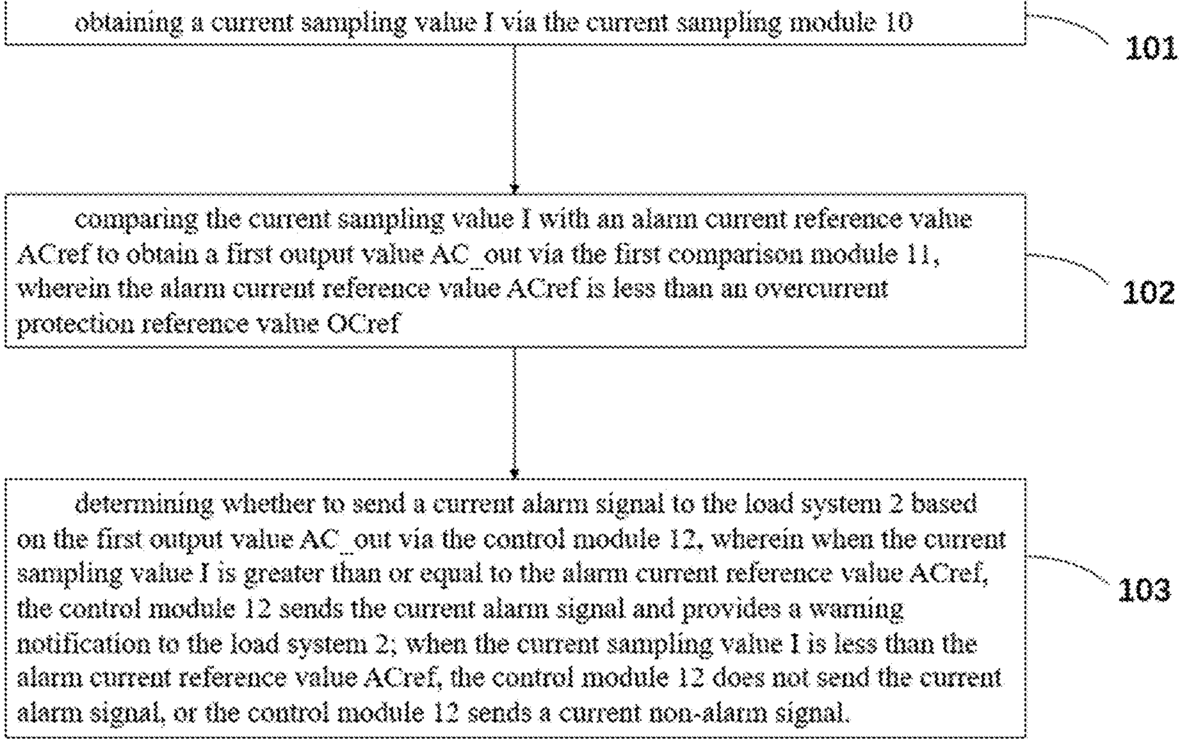
FIG. 2 is a flow diagram of an overcurrent alarm method of the power supply device of FIG. 1.

FIG. 2 shows a flow diagram of an overcurrent alarm method of the power supply device 1, and combining with FIG. 1, the overcurrent alarm method includes steps of:

101: obtaining a current sampling value I via the current sampling module 10;

102: comparing the current sampling value I with an alarm current reference value ACref to obtain a first output value AC_out via the first comparison module 11, wherein the alarm current reference value ACref is less than an overcurrent protection reference value OCref; and

103: determining whether to send a current alarm signal to the load system 2 based on the first output value AC_out via the control module 12, wherein when the current sampling value I is greater than or equal to the alarm current reference value ACref, the control module 12 sends the current alarm signal and provides a warning notification to the load system 2; when the current sampling value I is less than the alarm current reference value ACref, the control module 12 does not send the current alarm signal, or the control module 12 sends a current non-alarm signal.

Figure 3:
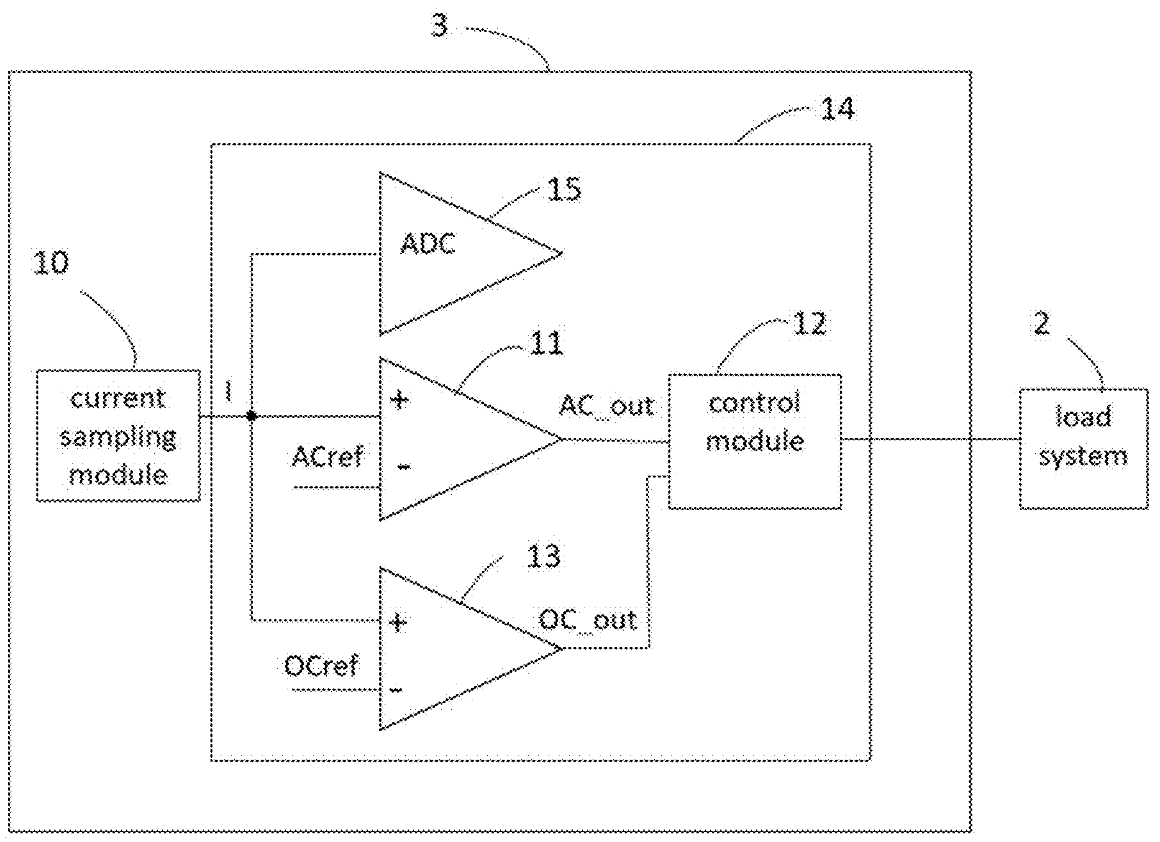
FIG. 3 is a structural diagram of a power supply device in embodiment two of the disclosure.

FIG. 3 shows a structural diagram of a power supply device 3 in embodiment two of the disclosure. Compared to the power supply device 1, the power supply device 3 further includes a second comparison module 13, while the rest configurations of the power supply device 3 remain the same as those of the power supply device 1. The first comparison module 11, the second comparison module 13 and the control module 12 are located within a microcontroller unit 14 of the power supply device 3. The second comparison module 13 is electrically connected between the current sampling module 10 and the control module 12 for comparing the current sampling value I and the overcurrent protection reference value OCref to obtain a second output value OC_out. When the control module 12 sends the current alarm signal, the power supply device 3 determines whether to cease to provide power to the load system 2 based on the second output value OC_out. In this embodiment, the power supply device 3 may adjust the alarm current reference value ACref and the overcurrent protection reference value OCref through programming.

Specifically, when the current sampling value I is greater than or equal to the overcurrent protection reference value OCref, the power supply device 3 stops providing power to at least one load of the load system 2; when the current sampling value I is less than the overcurrent protection reference value OCref, the power supply device 3 continues to provide power to the load system 2.

Figure 4:
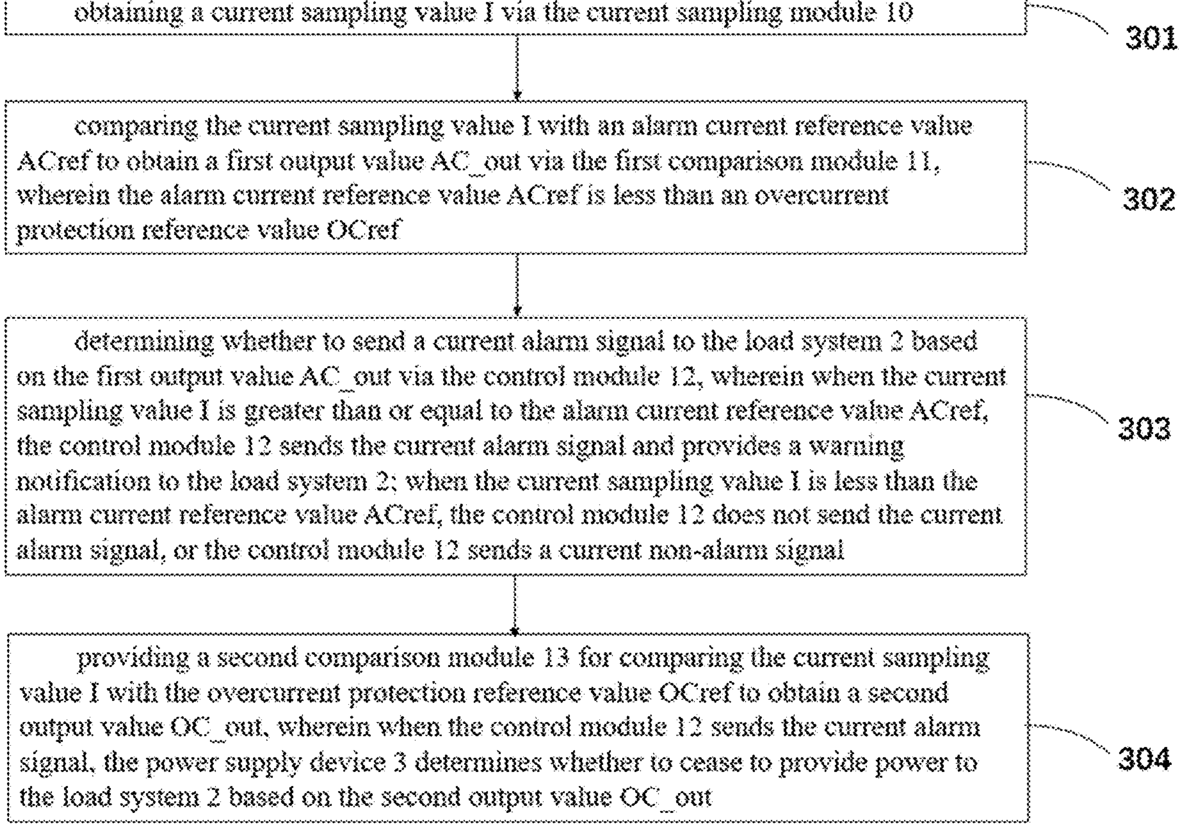
FIG. 4 is a flow diagram of an overcurrent alarm method of the power supply device of FIG. 3.

FIG. 4 shows a flow diagram of an overcurrent alarm method of the power supply device 3, and combining with FIG. 3, the overcurrent alarm method includes steps of:

301: obtaining a current sampling value I via the current sampling module 10;

302: comparing the current sampling value I with an alarm current reference value ACref to obtain a first output value AC_out via the first comparison module 11, wherein the alarm current reference value ACref is less than an overcurrent protection reference value OCref;

303: determining whether to send a current alarm signal to the load system 2 based on the first output value AC_out via the control module 12, wherein when the current sampling value I is greater than or equal to the alarm current reference value ACref, the control module 12 sends the current alarm signal and provides a warning notification to the load system 2; when the current sampling value I is less than the alarm current reference value ACref, the control module 12 does not send the current alarm signal, or the control module 12 sends a current non-alarm signal; and

304: providing a second comparison module 13 for comparing the current sampling value I with the overcurrent protection reference value OCref to obtain a second output value OC_out, wherein when the control module 12 sends the current alarm signal, the power supply device 3 determines whether to cease to provide power to the load system 2 based on the second output value OC_out.

Figure 5:
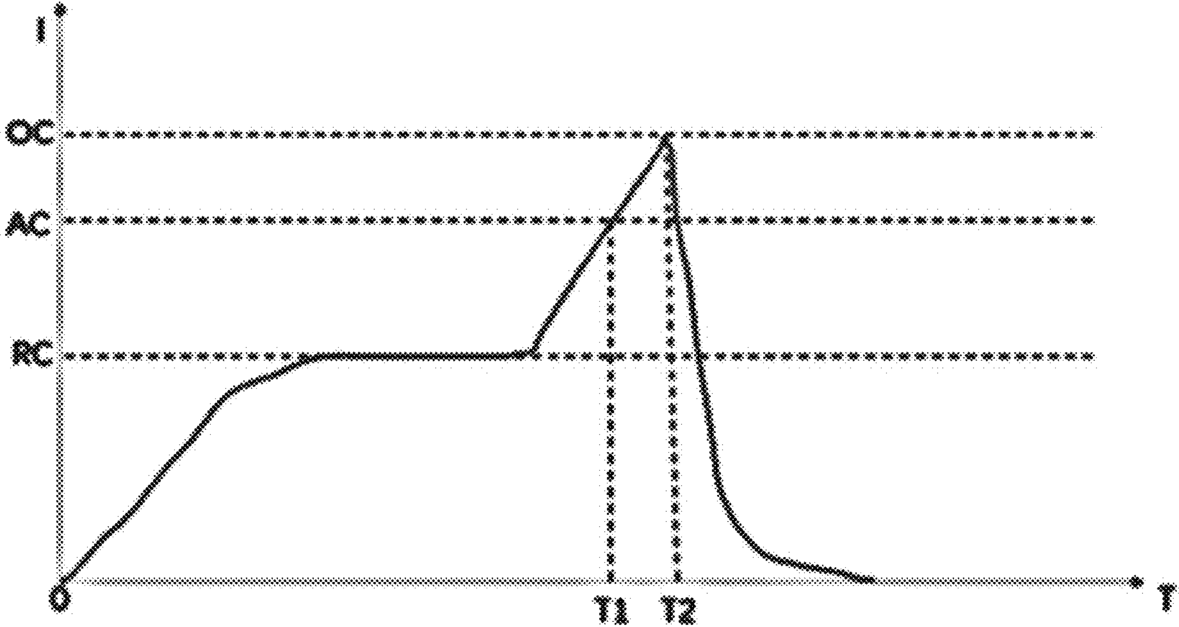
FIG. 5 is a schematic diagram showing the transition of a working current between normal operating state and overcurrent protection state.

FIG. 5 is a schematic diagram showing the transition of a working current in the power supply device between normal operating state and overcurrent protection state. As shown in FIG. 5, RC is a rated current, T1 is a time when the working current reaches an alarm current AC value, and T2 is a time when the working current reaches an over current OC value, wherein AC is less than OC. If $\Delta T=T2-T1$, then $\Delta T$ is the advance time for the current alarm. As shown in FIG. 2, modifying the AC value can shift the position of T1 and change the value of $\Delta T$, thereby expanding the power supply device's overcurrent alarm application range. Therefore, in various embodiments of the disclosure, the alarm current reference value ACref and the overcurrent protection reference value OCref are adjustable, achieving advance alarm for overload protection with adjustable time.

Figure 6:
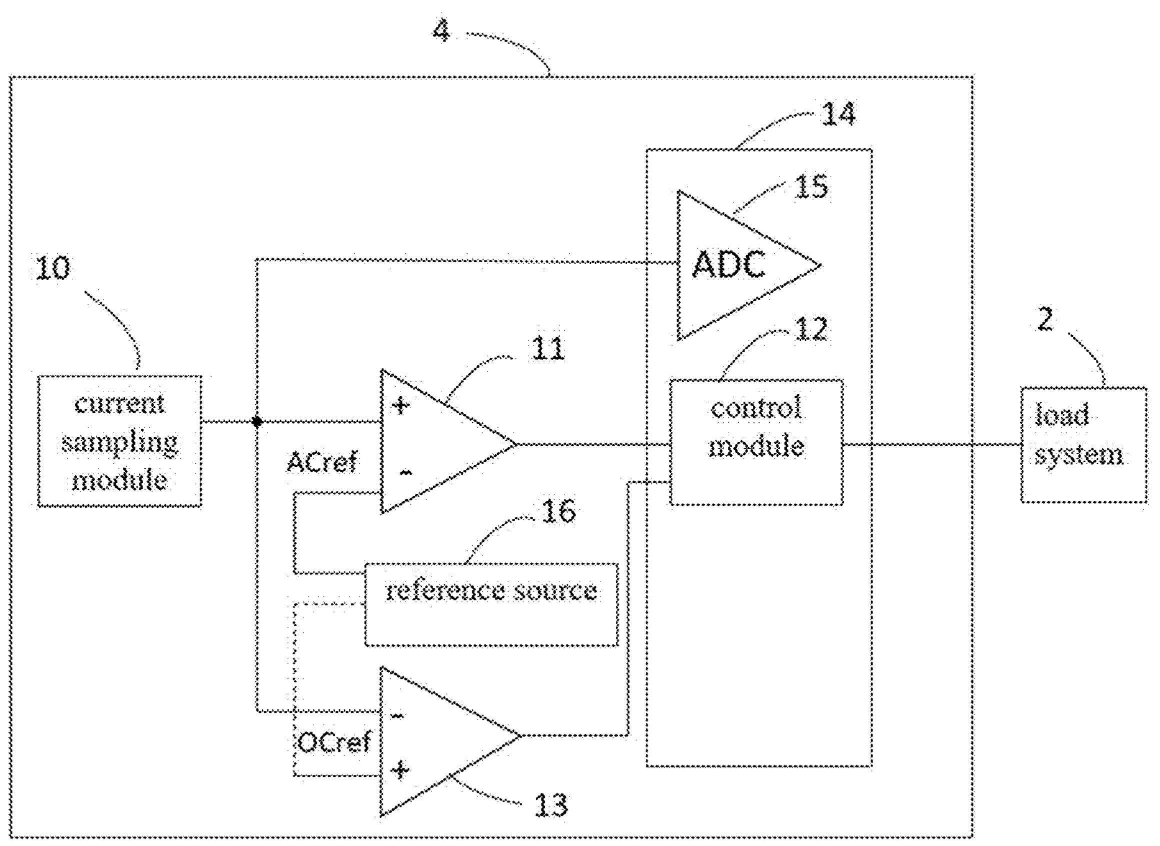
FIG. 6 is a structural diagram of a power supply device in embodiment three of the disclosure.

In other embodiments of the disclosure, the first comparison module 11 and the second comparison module 13 may also be disposed outside the microcontroller unit 14, and the control module 12 is disposed within the microcontroller unit 14. FIG. 6 shows a structural diagram of a power supply device 4 in embodiment three of the disclosure. The power supply device 4 is electrically connected to the load system 2 for providing power to the load system 2, the load system 2 includes a plurality of loads. Furthermore, the power supply device 4 includes a current sampling module 10, a first comparison module 11, a second comparison module 13 and a control module 12. The control module 12 is located within a microcontroller unit 14, the first comparison module 11 and the second comparison module 13 are located outside the microcontroller unit 14. In this embodiment, the power supply device 4 uses the first comparison module 11 and the second comparison module 13, located outside the microcontroller unit 14, to achieve overcurrent alarm. As ACref and OCref set, the advance alarm time $\Delta T$ is fixed, and the adjustment of $\Delta T$ can only be achieved by changing the circuit's parameters, which is a way of using fixed $\Delta T$.

In order to achieve advance alarm for overcurrent protection with adjustable time, the power supply device 4 of FIG. 6 further includes a programmable reference source 16 electrically connected between an ACref input end of the first comparison module 11 and an OCref input end of the second comparison module 13. The reference source 16 can utilize a variety of components, such as a DAC output end of the microcontroller unit 14, an adjustable voltage reference source, a Pulse Width Modulation (PWM) of the microcontroller unit 14, a frequency-to-voltage converter, or a plurality of comparators. The programmable reference source 16 enables adjustment of the alarm current reference value ACref, the overcurrent protection reference value OCref and the advance alarm time for overload. While using a plurality of comparators, the plurality of comparators may be completely located inside the microcontroller unit, or a portion of the plurality of comparators is located inside the microcontroller unit, and the other portion is located outside the microcontroller unit.

Figure 7:
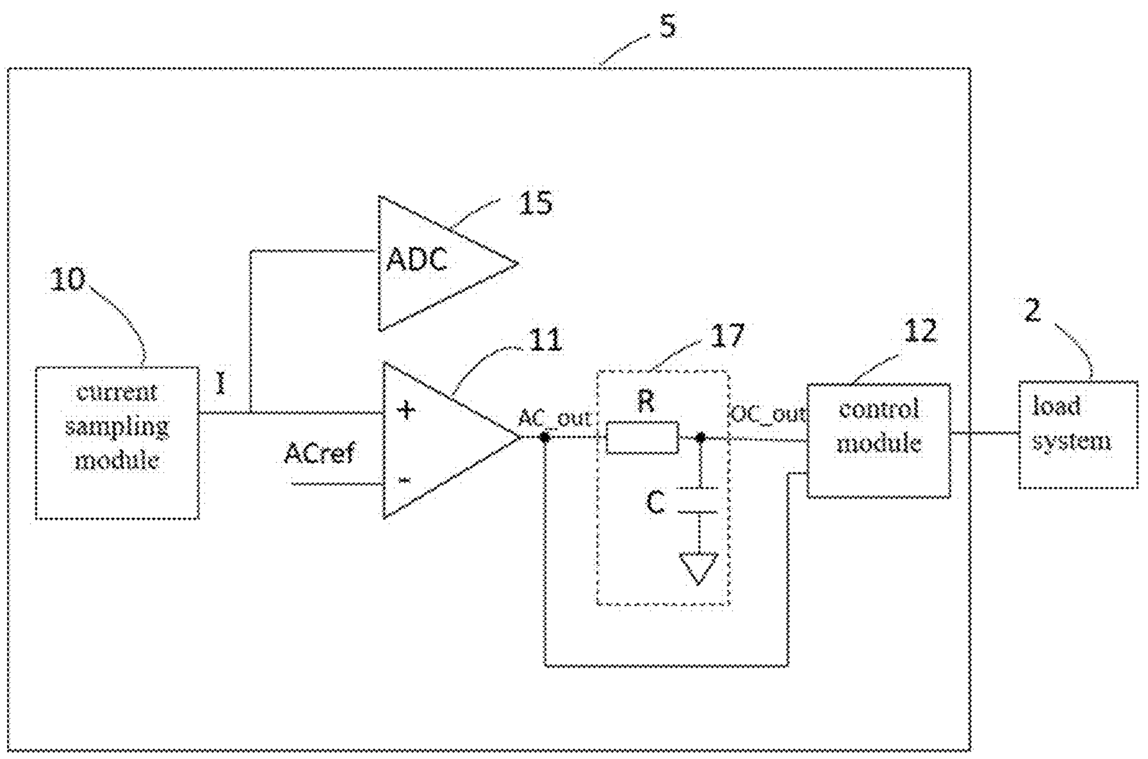
FIG. 7 is a structural diagram of a power supply device in embodiment four of the disclosure.

FIG. 7 is a structural diagram of a power supply device 5 in embodiment four of the disclosure. The power supply device 5 is electrically connected to a load system 2 for providing power to the load system 2, and the load system 2 includes a plurality of loads. The power supply device 5 includes a current sampling module 10 for obtaining a current sampling value I, a first comparison module 11 electrically connected to the current sampling module 10 for comparing the current sampling value I with an alarm current reference value ACref to obtain a first output value AC_out, a control module 12 and a delay module 17. When the current sampling value I is greater than or equal to the alarm current reference value ACref, the control module 12 sends a current alarm signal and provides a warning notification to the load system 2; when the current sampling value I is less than the alarm current reference value ACref, the control module 12 does not send the current alarm signal, or the control module 12 sends a current non-alarm signal.

The delay module 17 is electrically connected between the output end of the first comparison module 11 and the control module 12 for generating a second output value OC_out based on the first output value AC_out. When the control module 12 sends the current alarm signal, the power supply device 5 determines whether to cease to provide power to the load system 2 based on the second output value OC_out.

Specifically, the second output value OC_out is generated after a delay time delay from the first output value AC_out. When the duration that the current sampling value exceeds the alarm current reference value reaches a preset time threshold T, the control module sends an overcurrent protection signal and stops providing power to at least one of the loads. In other words, the control module 12 evaluates whether the current sampling value I has exceeded the set alarm current reference value ACref based on the first output value AC_out, thereby triggering the current alarm signal. If the current sampling value I exceeds the alarm current reference value Acref, and the delay time of the second output value OC_out exceeds the preset time threshold T compared to the first output value AC_out, then the control module 12 provides an overcurrent signal and stops providing power to at least one of the loads, in other words, the second output value OC_out is used to trigger the overcurrent signal. Furthermore, the preset time threshold T can be adjusted according to actual needs.

In this embodiment, the delay module 17 includes a resistor R and a capacitor C, the preset time threshold T can be determined by adjusting the parameters of the resistor R and the capacitor C. Besides, the second output value OC_out also triggers the relevant overcurrent protection device when it outputs as the overcurrent protection signal. In other embodiments, the delay module may include a microcontroller or a time relay. Finally, AC_Out is sent $\Delta T$ earlier than OC_Out, and $\Delta T$ may be adjusted by modifying the parameters of RC (a delay value) of the delay module 17.

In this embodiment, the control module 12 may be disposed inside the microcontroller unit of the power supply device 5, the first comparison module 11 may be disposed inside or outside the microcontroller unit. When the first comparison module 11 is located outside the microcontroller unit, the advance alarm for overcurrent protection with adjustable time can be achieved using the programmable reference source.

Figure 8:
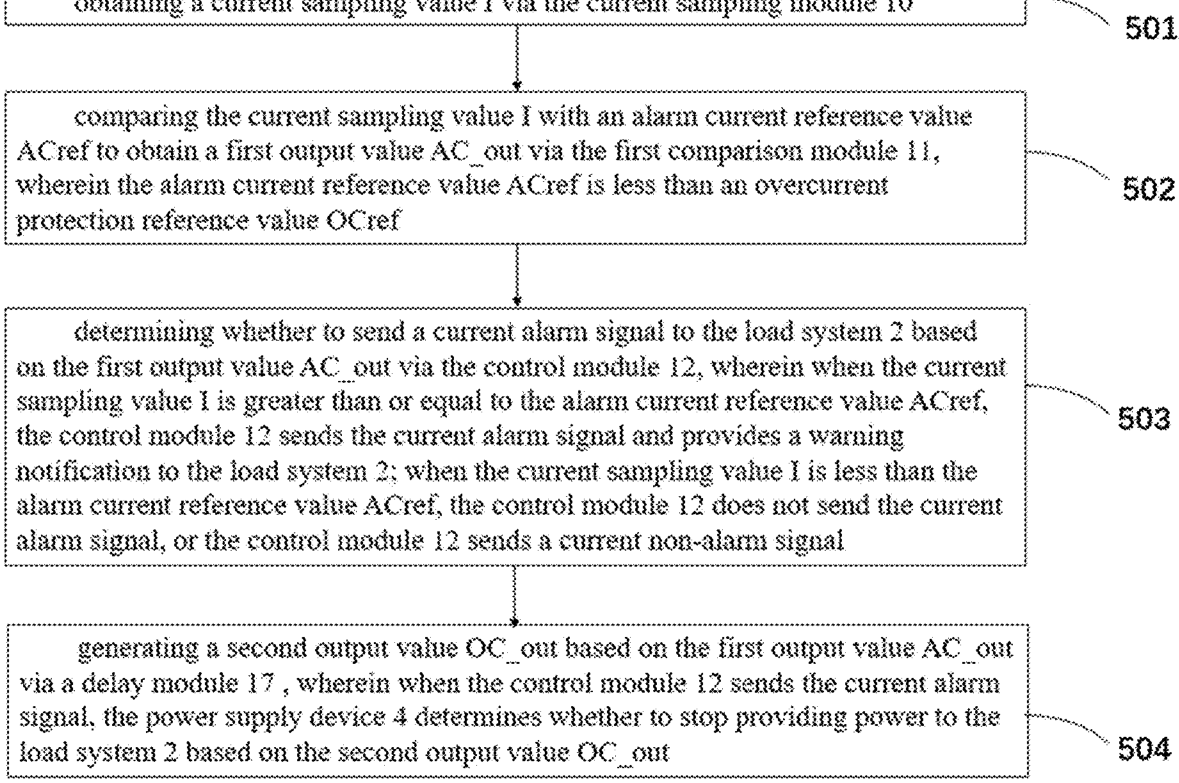
FIG. 8 is a flow diagram of an overcurrent alarm method of the power supply device of FIG. 7.

FIG. 8 is a flow diagram of an overcurrent alarm method of the power supply device 5, and combining with FIG. 7, the overcurrent alarm method includes steps of:

501: obtaining a current sampling value I via the current sampling module 10;

502: comparing the current sampling value I with an alarm current reference value ACref to obtain a first output value AC_out via the first comparison module 11, wherein the alarm current reference value ACref is less than an overcurrent protection reference value OCref;

503: determining whether to send a current alarm signal to the load system 2 based on the first output value AC_out, wherein when the current sampling value I is greater than or equal to the alarm current reference value ACref, the control module 12 sends the current alarm signal and provides a warning notification to the load system 2; when the current sampling value I is less than the alarm current reference value ACref, the control module 12 does not send the current alarm signal, or the control module 12 sends a current non-alarm signal; and

504: generating a second output value OC_out based on the first output value AC_out via a delay module 17, wherein when the control module 12 sends the current alarm signal, the power supply device 4 determines whether to stop providing power to the load system 2 based on the second output value OC_out.

Specifically, the second output value OC_out is generated after a delay time delay from the first output value AC_out. When the duration that the current sampling value exceeds the alarm current reference value reaches a preset time threshold T, the control module sends an overcurrent protection signal and stops providing power to at least one of the loads. In other words, the control module 12 evaluates whether the current sampling value I has exceeded the set alarm current reference value ACref based on the first output value AC_out, thereby triggering the current alarm signal. If the current sampling value I exceeds the alarm current reference value Acref, and the delay time of the second output value OC_out exceeds the preset time threshold T compared to the first output value AC_out, then the control module 12 provides an overcurrent signal and stops providing power to at least one of the loads, in other words, the second output value OC_out is used to trigger the overcurrent signal. Furthermore, the preset time threshold T can be adjusted according to actual needs.

Referring to FIGS. 1 to 8, the power supply devices in the various embodiments further include an analog-to-digital conversion module (ADC) 15 electrically connected to the current sampling module, and the current sampling value I is converted to a digital value by the analog-to-digital conversion module 15, which can record and adjust current parameters of the power supply devices in actual application of the power supply devices.

In some embodiments, the overcurrent alarm method of the disclosure can also be applied to other fields, enabling sampling and alarm management of physical quantities that can be converted into electrical signals, such as temperature, power, and more. For instance, temperature of the power supply device or its working environment can be monitored by a temperature sensor. The sensor not only detects the temperature but also triggers a temperature alarm when the electrical signal exceeds a preset threld. If the detected temperature surpasses the alarm value, the system is alerted that the current temperature is nearing the over temperature protection limit. Then the system can initiate a series of actions to safeguard the device.

In summary, the disclosure provides a power supply device electrically connected to a load system for providing power to the load system, the load system including a plurality of loads, the power supply device including: a current sampling module for obtaining a current sampling value; a first comparison module electrically connected to the current sampling module for comparing the current sampling value with an alarm current reference value to obtain a first output value, wherein the alarm current reference value is less than an overcurrent protection reference value; and a control module electrically connected to an output end of the first comparison module for determining whether to send a current alarm signal to the load system based on the first output value, wherein when the current sampling value is greater than or equal to the alarm current reference value, the control module sends the current alarm signal and provides a warning notification to the load system; when the current sampling value is less than the alarm current reference value, the control module does not send the current alarm signal, or the control module sends a current non-alarm signal.

The disclosure further provides an overcurrent alarm method for a power supply device, the power supply device providing power to a load system and including a current sampling module, a first comparison module and a control module electrically connected sequentially, the load system including a plurality of loads, wherein the overcurrent alarm method includes: obtaining a current sampling value via the current sampling module; comparing the current sampling value with an alarm current reference value to obtain a first output value via the first comparison module, wherein the alarm current reference value is less than an overcurrent protection reference value; and determining whether to send a current alarm signal to the load system based on the first output value via the control module, wherein when the current sampling value is greater than or equal to the alarm current reference value, the control module sends the current alarm signal and provides a warning notification to the load system; when the current sampling value is less than the alarm current reference value, the control module does not send the current alarm signal, or the control module sends a current non-alarm signal.

By utilizing the power supply device and the overcurrent alarm method of the disclosure, it is possible to achieve an advance alarm for overcurrent protection in the power supply device. Furthermore, advance alarm for overcurrent protection with adjustable time can be achieved by programming or programmable reference source. Overcurrent alarm enables the load system to be alerted in advance of an impending overload. This would allow for actively cutting off the non-essential loads or adopting other methods to reduce the load on the power supply device, ensuring the power supply to the essential loads and preventing significant losses due to the power supply device ceasing to provide power to all loads.

Although the embodiments of the disclosure have been illustrated and described, as for those ordinary in the art, it can be understood that these embodiments can have various changes, modifications, replacements and variations without departing from principle and spirit of the disclosure, and the protection scope of the disclosure is determined by the scope defined by the appended claims.

What is claimed is:

1. A power supply device electrically connected to a load system for providing power to the load system, the load system comprising a plurality of loads, the power supply device comprising:

a current sampling module for obtaining a current sampling value;

a first comparison module electrically connected to the current sampling module for comparing the current sampling value with an alarm current reference value to obtain a first output value, wherein the alarm current reference value is less than an overcurrent protection reference value; and a control module electrically connected to an output end of the first comparison module for determining whether to send a current alarm signal to the load system based on the first output value, wherein when the current sampling value is greater than or equal to the alarm current reference value, the control module sends the current alarm signal and provides a warning notification to the load system, after receiving the current alarm signal, the load system disconnects at least one of the loads; when the current sampling value is less than the alarm current reference value, the control module does not send the current alarm signal, or the control module sends a current non-alarm signal.

2. The power supply system according to claim 1, wherein the power supply device further comprises:

a second comparison module electrically connected to the current sampling module and the control module for comparing the current sampling value with the overcurrent protection reference value to obtain a second output value, wherein when the control module sends the current alarm signal, the power supply device determines whether to cease to provide power to the load system based on the second output value.

3. The power supply device according to claim 1, wherein the power supply device further comprises:

a delay module electrically connected between the output end of the first comparison module and the control module for generating a second output value based on the first output value, wherein when the control module sends the current alarm signal, the power supply device determines whether to cease to provide power to the load system based on the second output value.

4. The power supply device according to claim 2, wherein, when the current sampling value is greater than or equal to the overcurrent protection reference value, the power supply device stops providing power to at least one load of the load system;

when the current sampling value is less than the overcurrent protection reference value, the power supply device continues to provide power to the load system.

5. The power supply device according to claim 3, wherein, when the duration that the current sampling value exceeds the alarm current reference value reaches a preset time threshold, the control module sends an overcurrent protection signal and stops providing power to at least one of the loads.

6. The power supply device according to claim 1, wherein, the first comparison module and the control module are located within a microcontroller unit, and the alarm current reference value is adjustable.

7. The power supply device according to claim 2, wherein, the first comparison module, the second comparison module and the control module are located within a microcontroller unit, the alarm current reference value and the overcurrent protection reference value are adjustable.

8. The power supply device according to claim 1, wherein, the control module is located within a microcontroller unit, and the first comparison module is located outside the microcontroller unit.

9. The power supply device according to claim 8, wherein the power supply device further comprises:

a reference source electrically connected to an input end of the first comparison module for adjusting the alarm current reference value.

10. An overcurrent alarm method for a power supply device, the power supply device providing power to a load system and comprising a current sampling module, a first comparison module and a control module electrically connected sequentially, the load system comprising a plurality of loads, wherein the method comprises:

obtaining a current sampling value via the current sampling module;

comparing the current sampling value with an alarm current reference value to obtain a first output value via the first comparison module, wherein the alarm current reference value is less than an overcurrent protection reference value; and determining whether to send a current alarm signal to the load system based on the first output value via the control module, wherein when the current sampling value is greater than or equal to the alarm current reference value, the control module sends the current alarm signal and provides a warning notification to the load system, after receiving the current alarm signal, the load system disconnects at least one of the loads; when the current sampling value is less than the alarm current reference value, the control module does not send the current alarm signal, or the control module sends a current non-alarm signal.

11. The overcurrent alarm method according to claim 10, wherein the method further comprises:

providing a second comparison module for comparing the current sampling value with the overcurrent protection reference value to obtain a second output value, wherein when the control module sends the current alarm signal, the power supply device determines whether to cease to provide power to the load system based on the second output value.

12. The overcurrent alarm method according to claim 10, wherein the method further comprises:

providing a delay module for generating a second output value based on the first output value, wherein when the control module sends the current alarm signal, the power supply device determines whether to cease to provide power to the load system based on the second output value.

13. The overcurrent alarm method according to claim 11, wherein, when the current sampling value is greater than or equal to the overcurrent protection reference value, the power supply device stops providing power to at least one load of the load system;

when the current sampling value is less than the overcurrent protection reference value, the power supply device continues to provide power to the load system.

14. The overcurrent alarm method according to claim 12, wherein, when the duration that the current sampling value exceeds the alarm current reference value reaches a preset time threshold, the control module sends an overcurrent protection signal and stops providing power to at least one of the loads.

15. The overcurrent alarm method according to claim 10, wherein, the alarm current reference value and the overcurrent protection reference value are adjustable.

* * * * *